US011180044B2

(12) United States Patent
Maeshiro

(10) Patent No.: US 11,180,044 B2
(45) Date of Patent: Nov. 23, 2021

(54) ELECTRIC VEHICLE COOLING SYSTEM

(71) Applicant: Honda Motor Co., Ltd., Tokyo (JP)

(72) Inventor: Shinji Maeshiro, Cypress, CA (US)

(73) Assignee: Honda Motor Co., Ltd., Tokyo (JP)

( * ) Notice: Subject to any disclaimer, the term of this patent is extended or adjusted under 35 U.S.C. 154(b) by 252 days.

(21) Appl. No.: 16/441,611

(22) Filed: Jun. 14, 2019

(65) Prior Publication Data

US 2020/0391601 A1   Dec. 17, 2020

(51) Int. Cl.
*B60L 53/302* (2019.01)
*F16K 17/42* (2006.01)
*B60L 53/16* (2019.01)

(52) U.S. Cl.
CPC ............ *B60L 53/302* (2019.02); *B60L 53/16* (2019.02); *F16K 17/42* (2013.01)

(58) Field of Classification Search
CPC ......... B60L 53/302; B60L 53/16; F16K 17/42
USPC .......................................................... 320/109
See application file for complete search history.

(56) References Cited

U.S. PATENT DOCUMENTS

| | | | | |
|---|---|---|---|---|
| 5,909,099 A * | 6/1999 | Watanabe et al. | ...... | B60L 53/34 320/108 |
| 7,935,180 B2 * | 5/2011 | Weber | ...... | F25B 43/04 95/288 |
| 8,174,235 B2 * | 5/2012 | Dyer et al. | ...... | B60L 53/00 320/109 |
| 8,344,692 B2 * | 1/2013 | Sakurai | ...... | B60L 53/11 320/109 |
| 8,350,526 B2 * | 1/2013 | Dyer et al. | ...... | B60L 53/31 320/109 |
| 9,321,362 B2 | 4/2016 | Woo et al. | | |
| 9,343,785 B2 | 5/2016 | Bito | | |
| 9,786,961 B2 * | 10/2017 | Dyer et al. | ...... | B60L 58/26 |
| 9,863,403 B2 | 1/2018 | Gaither | | |
| 2017/0088005 A1 | 3/2017 | Christen et al. | | |
| 2017/0334309 A1 | 11/2017 | Kouno | | |
| 2018/0277283 A1 | 9/2018 | Remisch et al. | | |
| 2019/0255961 A1 * | 8/2019 | Heyne et al. | ...... | B60L 53/14 |

(Continued)

FOREIGN PATENT DOCUMENTS

| CN | 106347166 A | 1/2017 |
|---|---|---|
| CN | 106711549 A | 5/2017 |
| CN | 106828157 A | 6/2017 |

(Continued)

*Primary Examiner* — Sun J Lin
(74) *Attorney, Agent, or Firm* — Plumsea Law Group, LLC

(57) ABSTRACT

Enclosed herein is an electric motor vehicle cooling system that cycles liquid coolant from an electric motor vehicle charging station into an electric motor vehicle and back, to cool batteries of the electric motor vehicle during charging. The liquid coolant is pumped by a pump in the electric motor vehicle charging station through channels in a cable that is plugged into the electric motor vehicle. The cable has an adaptor with ports to allow the liquid coolant to exit the electric motor vehicle charging station, travel into the electric motor vehicle to cool the batteries, and return back into the electric motor vehicle charging station from the electric motor vehicle. This electric motor vehicle cooling system allows the electric motor vehicle charging station to perform most of the work of cooling the batteries of the electric motor vehicle, without overly taxing on-board thermal management systems of the electric motor vehicle.

19 Claims, 9 Drawing Sheets

(56) References Cited

U.S. PATENT DOCUMENTS

2020/0238844 A1* 7/2020 Grace et al. ............ B60L 53/30

FOREIGN PATENT DOCUMENTS

| | | | |
|---|---|---|---|
| CN | 107472066 | A | 12/2017 |
| CN | 206711659 | U | 12/2017 |
| CN | 207097480 | U | 3/2018 |
| CN | 108538484 | A | 9/2018 |
| CN | 207931502 | U | 10/2018 |
| CN | 108879823 | A | 11/2018 |
| DE | 102011100389 | A1 | 5/2012 |
| DE | 102017002999 | A1 | 10/2017 |
| DE | 202015009535 | U1 | 2/2018 |
| JP | 6123226 | B2 | 5/2017 |
| WO | 2018094927 | A1 | 5/2018 |

* cited by examiner

ELECTRIC VEHICLE COOLING SYSTEM

BACKGROUND

The embodiments relate generally to an electric motor vehicle cooling system that cools an electric motor vehicle by cycling a coolant from a charging station into the electric motor vehicle.

Generally, known electric motor vehicles use a variety of developing technologies to manage the electrical requirements of storing electrical power in batteries, discharging the batteries to power the motor, and then recharging the batteries. One of these requirements is thermal management of the batteries and electrical systems, to ensure that they are kept within an optimum temperature range that best ensures performance and minimizes loss of energy. In particular, charging the batteries generates a large amount of heat that must be managed.

Charging of the batteries typically used in electric motor vehicles requires a large amount of electric power, delivered at a high rate in order to charge the vehicle within a reasonable amount of time. Generally, the amount of heat generated by a battery charging process is the square of the rate of electrical charging. Therefore, for modern high-capacity batteries that charge at fast rates, very large amounts of heat can be generated. In particular, modern charging systems such as direct current fast charging ("DCFC") and other "level 3" charging systems are designed to charge at high rates of around 50 kW or more. The batteries must nonetheless be maintained within a safe operating temperature while charging, in order to ensure that the batteries are not damaged or degraded.

Known battery thermal management systems use a variety of cooling mechanisms to address the problem of overheating. Generally, these battery thermal management systems are built into the electric motor vehicle and may be used both in motion while driving and while stationary during charging.

However, many known battery thermal management systems suffer disadvantages when stationary. For example, when stationary, air cooling systems are not able to take advantage of the air movement created by the travelling vehicle. Fans may be used to address this situation, which nonetheless may create undesirable noise and unnecessary loss of efficiency due to needing to use electricity to run the onboard fans while also trying to charge the batteries with electricity.

In liquid cooling systems, known electric motor vehicles may include a variety of heat transfer mechanisms such as radiators, other heat exchangers, and pumps to addresses these issues—all located on the motor vehicle. These systems may present problems such as increased vehicle weight, and the electrical load need to run these systems while charging.

Accordingly, the problem of ensuring proper heat management during charging of the batteries remains.

Thus there is a need in the art for electric motor vehicle cooling systems that address these shortcomings in the art.

SUMMARY

In one aspect, this disclosure provides an electric motor vehicle cooling system, comprising: an electric motor vehicle charging station; an electric motor vehicle including a battery; and a liquid coolant; wherein the charging station is in fluidic communication with the vehicle, such that the charging station and the vehicle collectively form a battery cooling loop through which the liquid coolant is cycled.

In another aspect, this disclosure provides an electric motor vehicle comprising: a battery; a battery temperature management system; and a receptor, the receptor being configured to interface with an adaptor of an electric motor vehicle charging station; wherein the receptor includes a liquid coolant inlet port, the liquid coolant inlet port being configured to receive a liquid coolant into the electric motor vehicle, and a liquid coolant outlet port, the liquid coolant outlet port being configured to allow the liquid coolant to exit the electric motor vehicle; and wherein the liquid coolant interfaces with the battery temperature management system, in such a manner as to cool the battery when the electric motor vehicle is charging at an electric motor vehicle charging station.

In a third aspect, this disclosure provides an electric motor vehicle charging station, comprising: a base, the base including a source of electricity and a pump; a cable, the cable being connected to the base at a first end of the cable, the cable including at least one electrical wire that carries electrical current from the source of electricity, and a hose including an outlet channel and an inlet channel; an adaptor, the adaptor being connected to a second end of the cable and being configured to interface with a receptor on an electric motor vehicle; and liquid coolant; wherein the adaptor further includes (1) at least one electrical charging connector, connected to the at least one electrical wire in the cable; (2) a liquid coolant outlet port, connected to the outlet channel of the hose and configured to allow the liquid coolant to exit the charging station, and (3) a liquid coolant inlet port; connected to the inlet channel of the hose and configured to received liquid coolant into the charging station; and wherein the charging station is configured to move the liquid coolant with the pump in a cycle from the base, through the outlet channel of the hose in the cable, out of the liquid coolant outlet port on the adaptor, into the electric motor vehicle, into the liquid coolant inlet port on the adaptor, through the inlet channel of the hose in the cable, and back into the base.

Other systems, methods, features and advantages of the exemplary embodiments will be, or will become, apparent to one of ordinary skill in the art upon examination of the following figures and detailed description. It is intended that all such additional systems, methods, features and advantages be included within this description and this summary, be within the scope and protected by the claims.

BRIEF DESCRIPTION OF THE DRAWINGS

The exemplary embodiments can be better understood with reference to the following drawings and description. The components in the figures are not necessarily to scale. Moreover, in the figures, like reference numerals designate corresponding parts throughout the different views.

DETAILED DESCRIPTION

Systems and apparatuses to cool an electric motor vehicle are broadly disclosed. These cooling systems allow a liquid coolant to travel from a charging station to an electric motor vehicle in order to cool the batteries during a charging process. Generally, embodiments of this disclosure are various shown in FIGS. 1 through 9.

A variety of terms are used in this disclosure. These terms are used with reference to the following definitions and descriptions, as well as the knowledge of a person having ordinary skill in the art of electric motor vehicles.

Figure 1:
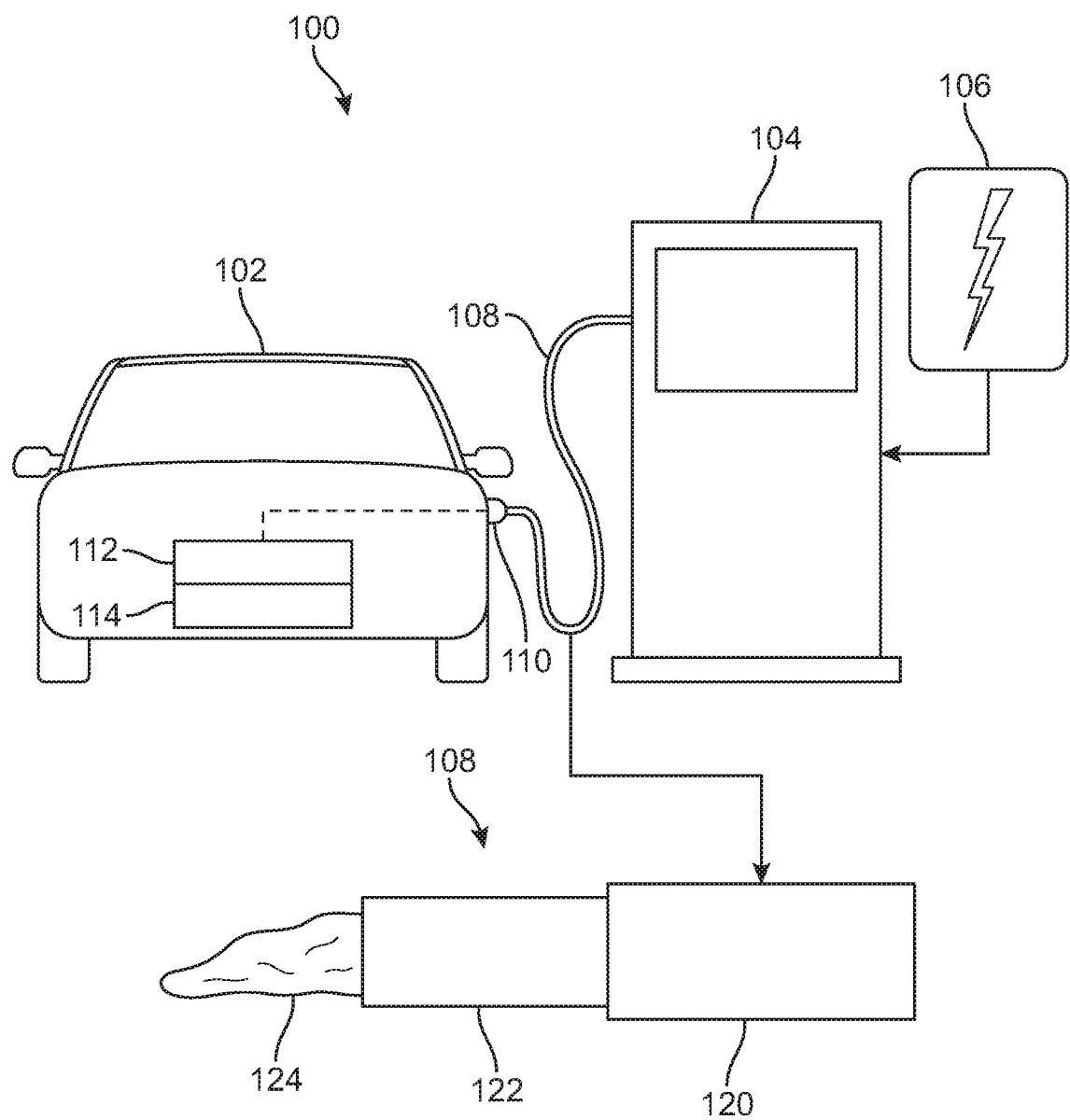
FIG. 1 is a schematic view of an example embodiment of an electric motor vehicle cooling system.

FIG. 1 shows a schematic of an electric vehicle cooling system 100. Cooling system 100 broadly includes an electric motor vehicle 102 and an electric motor vehicle charging station 104. Electric motor vehicle 102 may generally be any type of electric motor vehicle.

The term "motor vehicle" as used throughout the specification and claims refers to any moving vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft.

An electric motor vehicle is a motor vehicle that uses electricity to power a motor that provides propulsion. Electric motor vehicles may exclusively use electricity to power movement of the vehicle, or may use electricity in combination with other propulsion mechanisms in a hybrid vehicle.

Electric motor vehicle charging station 104 may generally be any apparatus that is fixed in location and configured to provide electrical charge to an electric motor vehicle. Charging station 104 includes source of electricity 106. Source of electricity 106 may be a connection a widely used electric grid, or may be a dedicated electrical source like a set of local solar panels. Charging station 104 also includes a cable 108. At the end of cable 108 is adaptor 110 that connects the charging station 104 to vehicle 102.

Cable 108 is also shown in FIG. 1 in a side exploded view. Specifically, cable 108 includes housing layer 120 that may include wires for conducting electricity, and central hose 122 that may carry liquid coolant 124. Cable 108 is also shown in additional detail in FIG. 3.

Generally, liquid coolant may generally be any substance that is liquid at normal operating temperatures for electric motor vehicles, and is capable of acting as a coolant due to its specific heat. In some embodiments, the liquid coolant may be selected from the group consisting of: water, ethylene glycol, polyalkylene glycol, polyethylene glycol, and mixtures thereof.

As shown in the top portion of FIG. 1, when adaptor 110 is connected to vehicle 102, both electrical charge and liquid coolant may be transferred from charging station 104 to vehicle 102. The charging station 104 and the vehicle 102 are therefore in fluidic communication with each other, such as to form a battery cooling loop. Specifically, vehicle may include battery temperature management system 112 and one or more batteries 114. Liquid coolant 124 may interface with battery temperature management system 112, as detailed in later figures discussed below.

Figure 2:
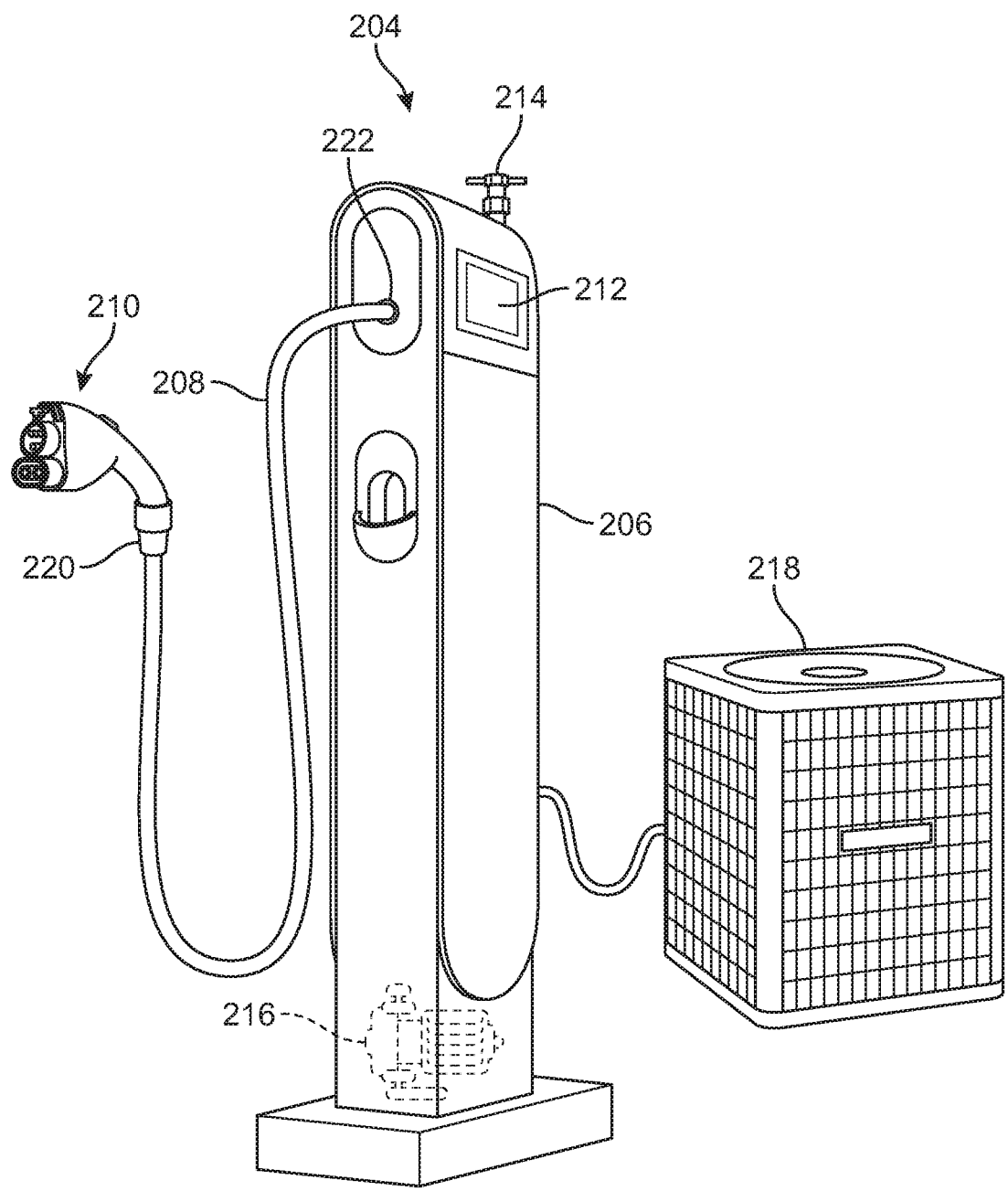
FIG. 2 is an isometric view of a charging station including cooling features.

FIG. 2 shows the charging station in greater detail. Charging station 204 generally includes base 206, cable 208, adaptor 210, controller 212, bleed valve 214, pump 216, and chiller 218.

First, base 206 may be the main structure of charging station 204. Base 206 may include the source of electricity as shown in FIG. 1 as 106, such as a connection to an electric grid. Base 206 may also include pump 216, pump 216 may be used to move liquid coolant 124 in the cooling cycle as discussed below.

Controller 212 is also located in base 206 in the embodiment shown in FIG. 2. Controller 212 may be any general purpose computer that is capable of receiving electronic data and sending electronic commands in response to the data to other components of the cooling system. Specifically, the control 212 may be configured activate the pump and the chiller based on temperature data received from the electric motor vehicle via the control port (discussed below).

Bleed valve 214 on base 206 may be used when air becomes trapped in the cooling line. Specifically, adaptor 210 connects to an electric motor vehicle in order to transfer electricity and liquid coolant 124—as shown in FIG. 1. When this connection happens, air may potentially be trapped in the liquid coolant line. This air may mix with liquid coolant 124, and would decrease the efficiency of the cooling heat transfers. Bleed valve 214 allows controller 212 to bleed off any such air, so as to ensure that the cooling cycle stays efficient.

Next, cable 208 may be attached to adaptor 210 at first end 220 of cable 208, and attached to base 206 at second end 222. Cable 208 may include one or more electrical wires to carry electricity to charge the electric motor vehicle, and also carry liquid coolant 124. Cable 208 may be flexible, so as to enable users to position adaptor 210 where needed to connect adaptor 210 to their electric motor vehicle for charging.

Chiller 218 may generally be any type of chiller capable of exchanging heat between the liquid coolant 124 and a refrigerant that exchanges heat with the outside air. Chiller 218 may cool the liquid coolant 124 after liquid coolant 124 has received heat from the batteries in the vehicle.

Figure 3:
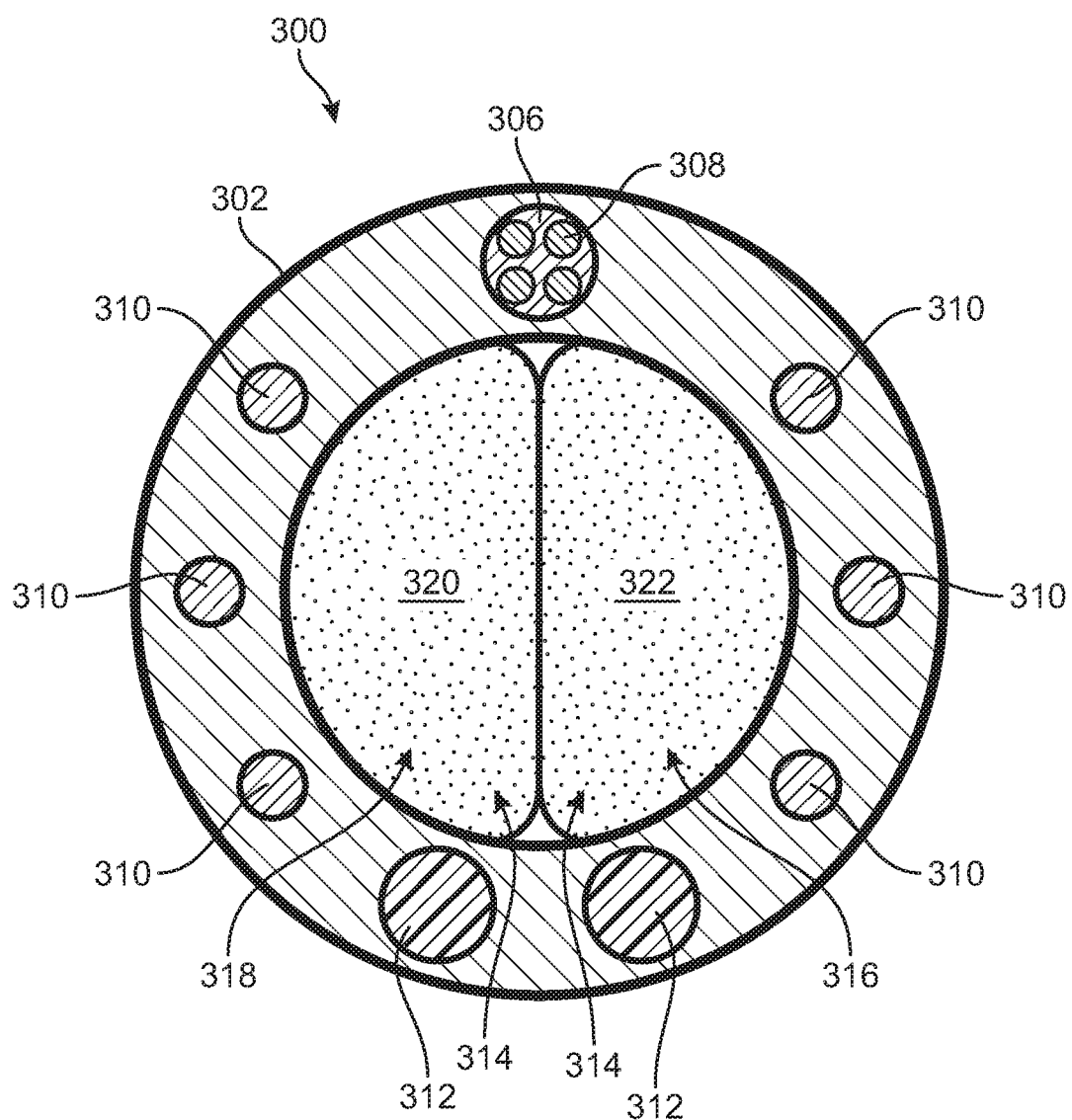
FIG. 3 is a cross-sectional view of an embodiment of a charging station cable.

FIG. 3 shows a cross-section of the cable 300 in greater detail. Generally, cable 302 may include outer protective layer 302, housing layer 304, and hose 314. Outer protective layer 302 may be a flexible solid plastic designed to enclose the other layers. Housing layer 304 may hold several electrical components, as variously shown.

Specifically, housing layer 304 may include control housing 306. Control housing 306 may include several control wires 308 that transmit electronic data. Control wires 308 may transfer data from the electric motor vehicle, when the adaptor is pulled into the vehicle and the charging station is charging the vehicle, such as temperature data. Control wires 308 may also transfer data to the vehicle that may control one or more components of a battery temperature management system as shown in greater detail below.

Housing layer 304 may also include several electrical wires 310 that transmit electricity. Electrical wires 310 may transmit electricity in a first format (e.g., alternating current or direct current, certain amperage or voltage, etc.). Secondary electrical wires 312 may also transmit electricity in a second format. In some embodiments, secondary electrical wires 312 may be used for direct current fast charging.

Hose 314 may be central to the cable 300. In the embodiment shown in FIG. 3, hose 314 and housing layer 304 are coaxial with housing layer 304 surrounding hose 314. Hose 314 may include two subchannels: outlet channel 320 and inlet channel 322. Outlet channel 320 may carry liquid coolant 124 that is moving from base 206 to vehicle 102. Inlet channel 322 may carry liquid coolant 124 that is moving from vehicle 102 to base 206.

Figure 4:
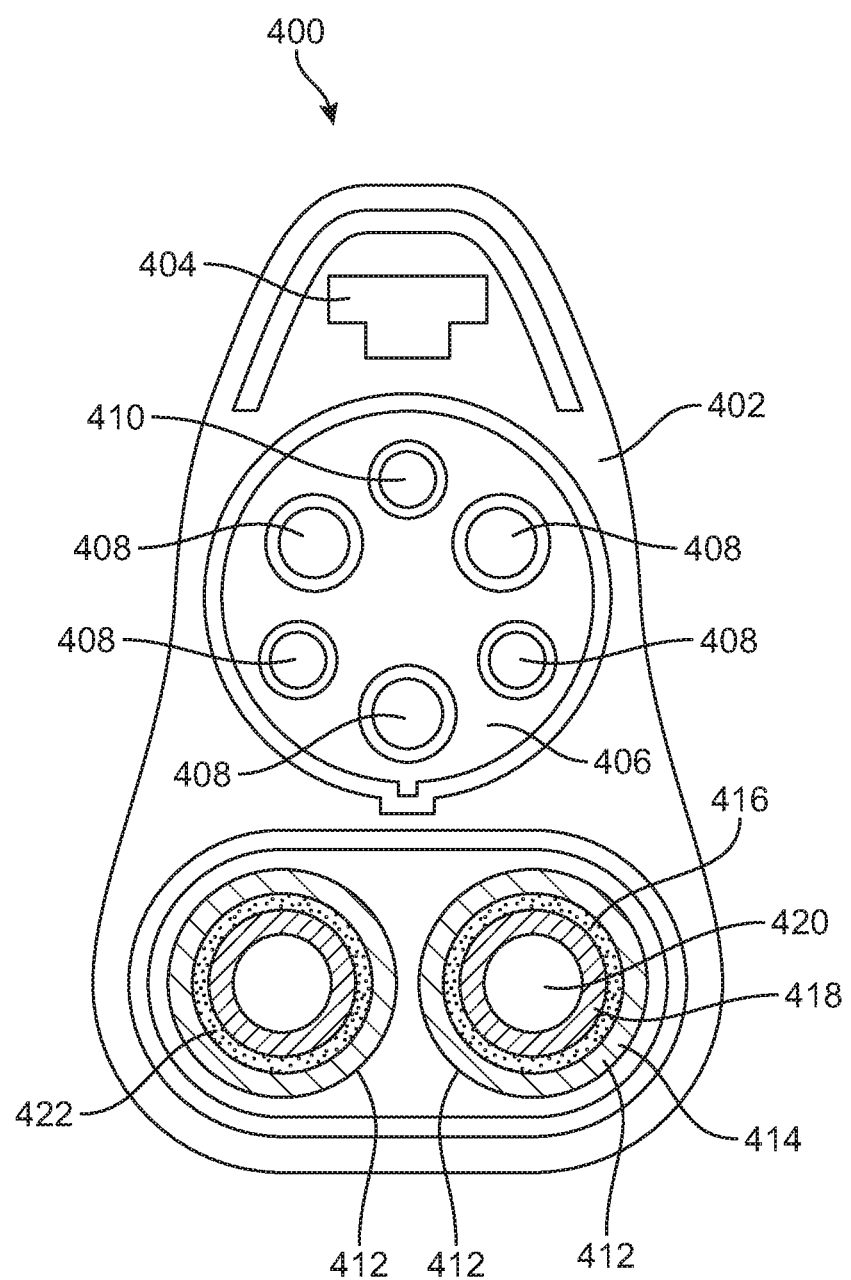
FIG. 4 is a front view of an embodiment of an adaptor that connects a charging station to an electric motor vehicle.

FIG. 4 shows adaptor 400 in greater detail. Generally, adaptor 400 may be in any configuration that allows cable 208 to connect to vehicle 102. The connection provided by adaptor 400 should be snug and secure, so as to ensure that electricity and liquid coolant 124 can be safety transferred from charging station 204 to vehicle 102. The connection should also be reversible, so that users may initiate the connection and disconnection easily and without the use of tools.

As shown, adaptor 400 is in the shape of a connector using the SAE Combo CSS standard. This standard uses standard IEC 62196, and is sometimes referred to as a type of "CHAdeMO" standard.

Generally, adaptor 400 may include body 402, latch 404, first electrical charging port area 406, and second electrical charging port area 412. Within first electrical charging port area 408, one or more electrical connectors 408 may be deposed. Electrical connectors 408 may interface with electrical wires 310. Area 408 may also include control port 410. Control port 410 may interface with control wires 308 shown in FIG. 8 to allow electronic data communication between vehicle 102 and charging station 204.

Second electrical charging port area 408 may include charging port 420 that interfaces with secondary electrical wires 312. Area 408 may also include liquid coolant inlet port 416. In the embodiment shown, liquid coolant inlet port 416 may be located between housing layers 418 and 414. Inlet port 416 is therefore concentric around electrical charging port 420. Liquid coolant outlet port 422 is similarly configured around another electrical charging port in area 412.

Figure 5:
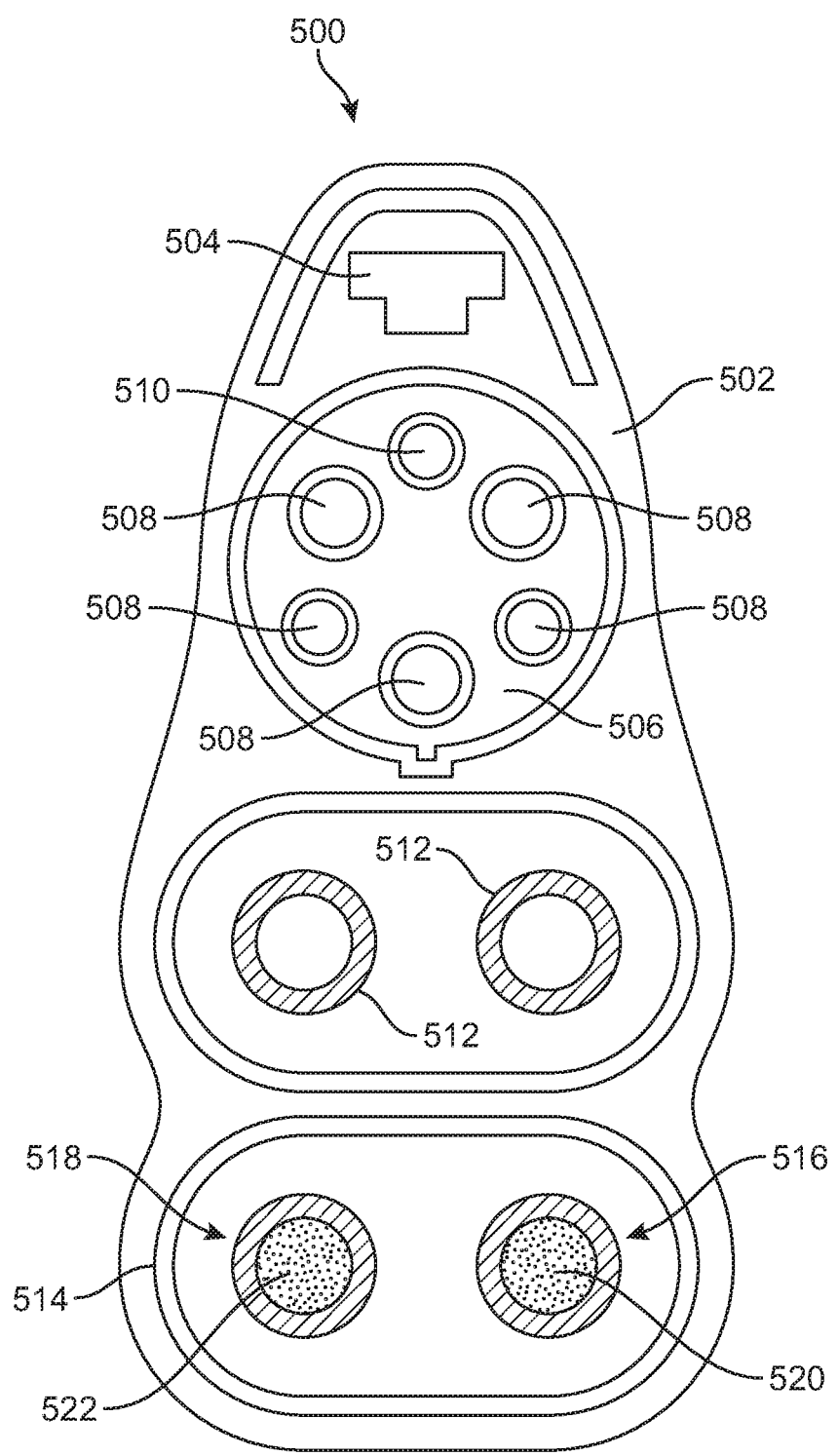
FIG. 5 is a front view of a second embodiment of an adaptor that connects a charging station to an electric motor vehicle.

FIG. 5 shows an alternative embodiment of an adaptor 500. In this embodiment, adaptor 500 still includes body 502, latch 504, first electrical charging port area 506, and second electrical charging port area 512. However, in this embodiment, liquid coolant inlet port 516 and liquid coolant outlet port 518 are located in area 514 separate from second electrical charging port area 512. This particular embodiment would be a larger change from existing IEC 62196 standards for charging adaptors. Nonetheless, this embodiment allows liquid coolant 520 and liquid coolant 522 to be kept further away from any electrical ports.

Figure 6:
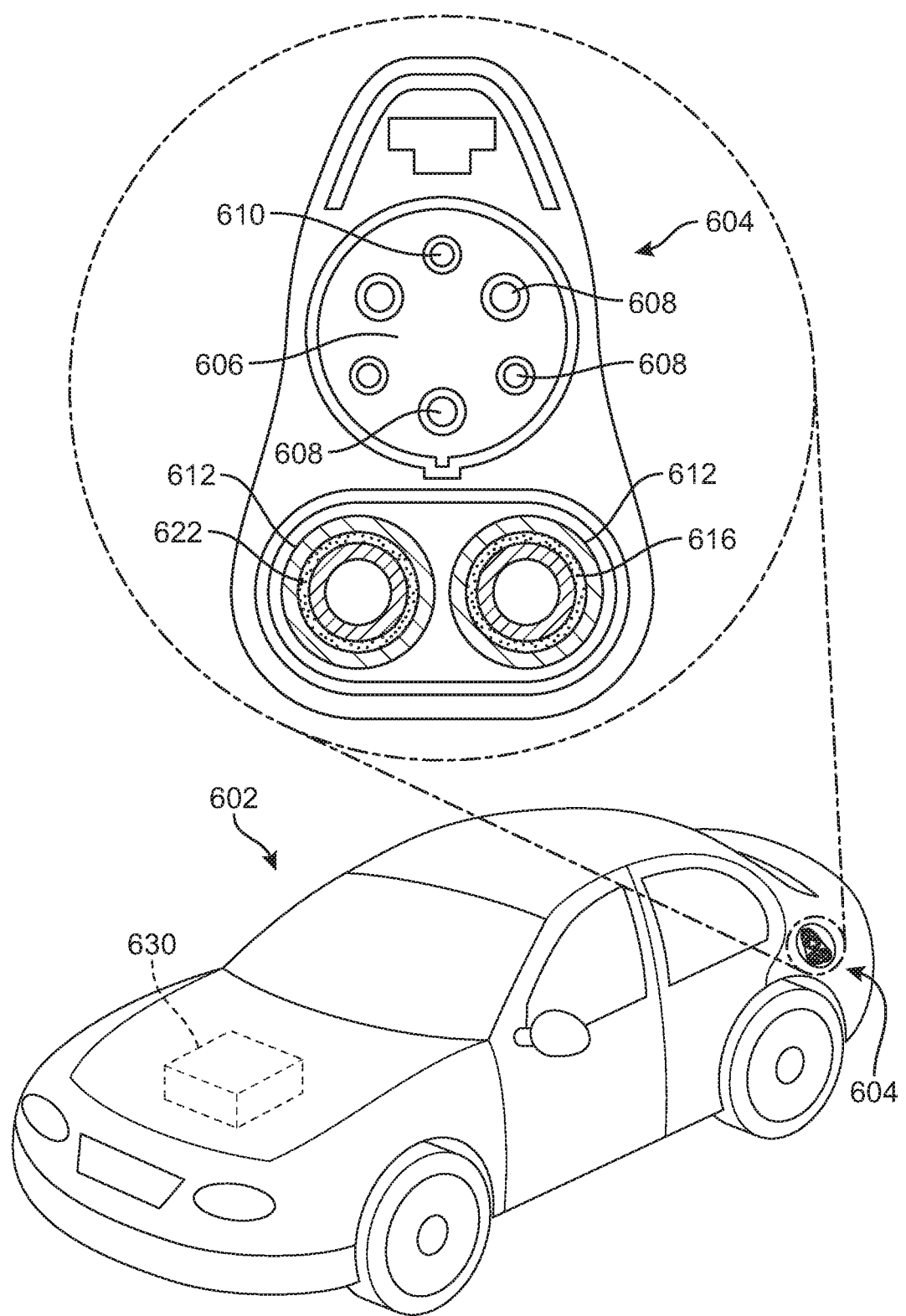
FIG. 6 is a front view of an embodiment of a receptor on an electric motor vehicle that connects to an adaptor on a charging station to connect the two.

FIG. 6 shows an embodiment of a receptor 604 on an electric motor vehicle 602. Receptor 604 is configured to interface with adaptor 400 shown in FIG. 4 and discussed above. In various embodiments, adaptor 400 may be a "male" connector that plugs into the "female" plug of receptor 604, or vice versa. Either way, adaptor 400 and receptor 604 are designed to be complimentary so as to ensure a secure connection between the two—that allows electricity and liquid coolant to be transferred from charging station 204 to vehicle 602.

In particular, as shown in FIG. 6, receptor 604 includes inlet port 616 that interfaces with outlet port 422 on adaptor 400. Inlet port 616 receives liquid coolant into vehicle 602 that is moved out of the charging station through outlet port 422 on the adaptor 400. Receptor 604 also includes outlet port 622 that allows liquid coolant to exit vehicle 602. Liquid coolant that exits vehicle 602 via outlet port 622 is received into the charging station 204 via inlet port 416 on adaptor 400.

Receptor 604 also includes vehicle control port 610. Vehicle control port 610 may interface with control port 410 on adaptor 400. As with control port 400, vehicle control port 610 may transmit electronic data. Specifically, vehicle port 602 may include vehicle controller 630 that is configured to accept battery temperature data generated from a battery temperature sensor and send the battery temperature data to the vehicle control port 610 on receptor 604. In this way, electronic data may be transferred back and forth between the charging station and vehicle 602. This data may automatically control the cooling system and the electrical charging of the vehicle.

Figure 7:
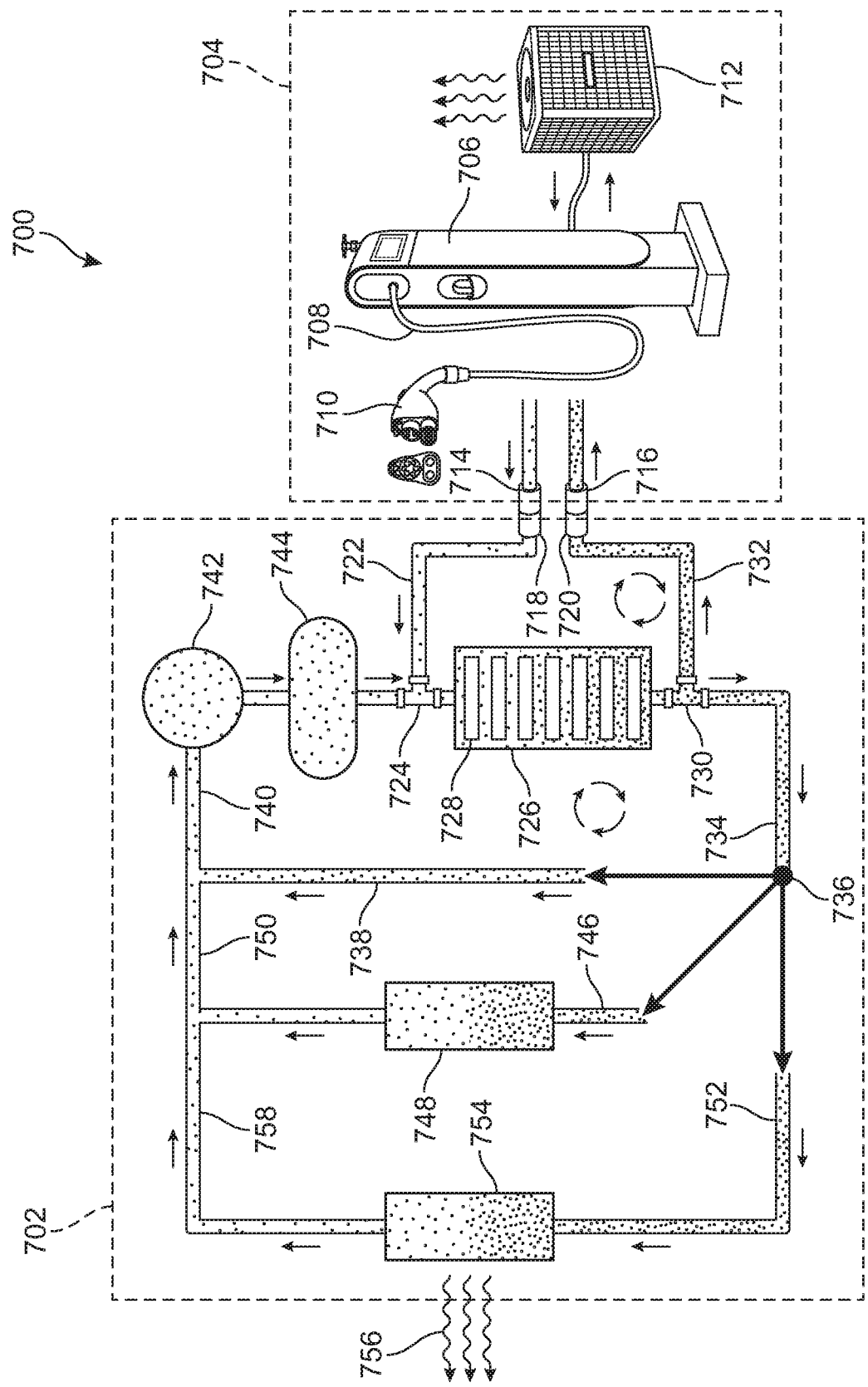
FIG. 7 is a diagram of an embodiment of an electric motor vehicle cooling system.

FIG. 7 shows a schematic of the entire electric motor vehicle cooing system 700, as the liquid coolant is cycled through it. Cooling system 700 includes vehicle side 702 and charging station side 704. Charging station side 704 is substantially as shown in FIG. 2 and discussed above.

Specifically, charging station side 704 of cooling system 700 includes base 706, cable 708, adaptor 710, and chiller 712. Charging station side 704 interfaces with vehicle side 702 at liquid coolant outlet port 714 and liquid coolant inlet port 716. Namely, liquid coolant outlet port 714 allows liquid coolant to exit charging station 704 and enter vehicle side 702 at vehicle inlet port 718.

Vehicle side 702 includes a variety of components that collectively make up the vehicle's battery temperature management system, hereinafter referred as 702. Battery temperature management system 702 includes several components in fluidic communication with each other that allow the liquid coolant within the vehicle to exchange heat with the batteries 728. Specifically, battery temperature management system 702 includes: battery heat sink 726, chiller 748, radiator 754, pump 742, and heater 744 (for low environmental temperatures).

As shown in FIG. 7, battery temperature management system 702 also includes first bypass valve 724 and second bypass valve 730. These bypass valves 724 and 730 allow liquid coolant to pass through battery heat sink 726 that is adjacent to batteries 728, without passing through the other components of battery temperature management system 702. First bypass valve 724 may also be referred to as a vehicle battery temperature management system inlet valve. Second bypass valve 730 may also be referred to as a vehicle battery temperature management system outlet valve.

In an example embodiment, first bypass valve 724 and/or second bypass valve 730 are three-way valves that may be used to control flow direction within battery temperature management system 702. In this way, liquid coolant from charging station 704 may complete a cooling cycle in a loop without using onboard components such as onboard chiller 748 or radiator 754.

Namely, in this embodiment, liquid coolant is moved with pump 216 in a cycle from base 706, along outlet channel 320 of hose 314 in cable 708, through outlet channel 714 on adaptor 710, into the vehicle 602 via vehicle inlet port 718, along vehicle channel 722, through first bypass valve 724, through battery heat sink 726, through second bypass valve 730, along vehicle channel 732 to vehicle outlet port 720, out of vehicle outlet port 720, and into inlet port 716, back along cable 708 through inlet channel 322, and back to base 706 where it interfaces with chiller 712 to release the heat.

This cooling cycle therefor allows charging station side 704 to perform the work of pumping and chilling the liquid coolant, while the vehicle side battery temperature management system is largely passive in that neither the onboard chiller nor the onboard radiator need be used. In this way, heat can be removed from the batteries during charging in an efficient manner.

Figure 8:
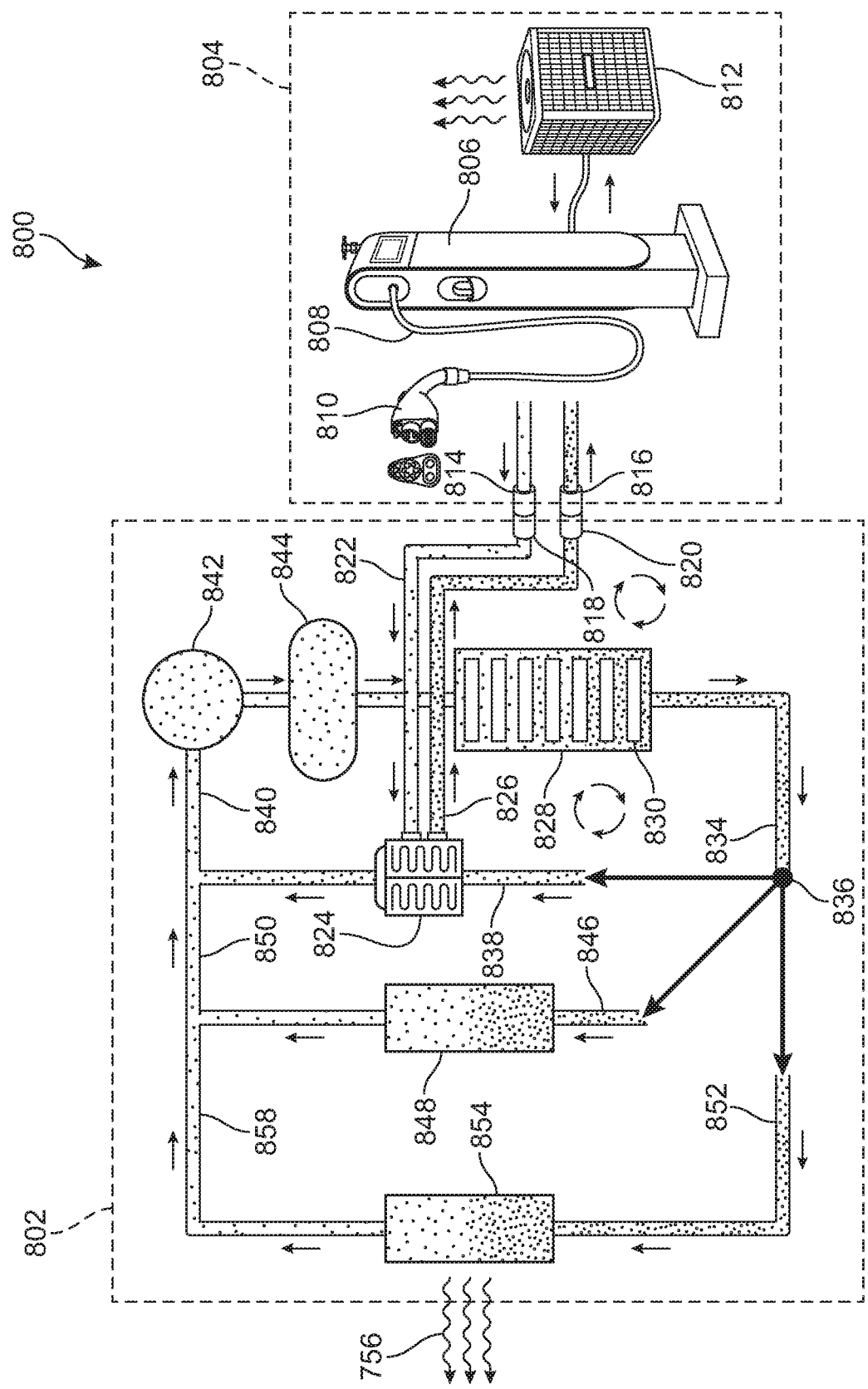
FIG. 8 is a diagram of a second embodiment of an electric motor vehicle cooling system.

FIG. 8 shows an alternative embodiment of an electric motor vehicle cooling system 800. In this embodiment, vehicle battery temperature management system 802 includes additional heat exchanger 824. Heat exchanger 824 may be configured to exchange heat between the liquid coolant pumped in from the charging station 804 and an internal coolant inside the battery temperature management system 802. This embodiment allows vehicle battery temperature management system 802 and charging station 804 to remain as closed loops that are not in fluidic communication—but are only in thermal communication such that they interface on separate sides of heat exchanger 824.

Specifically, in the embodiment shown in FIG. 8, liquid coolant is pumped from charging station 804 from base 806, along cable 808, out of outlet port 814 on adaptor 810, into vehicle inlet port 818, through vehicle channel 822, to heat exchanger 824, back along vehicle channel 826, out vehicle outlet port 820, into inlet port 816 in adaptor 810, back along cable 808, and to base 806 where it is chilled with chiller 812.

In this embodiment, vehicle pump 842 may be used to move internal coolant along its cooling loop inside battery temperature management system 802. Specifically, internal coolant may be pumped by pump 842 along battery heat sink 828, along channel 836, through valve 836, along channel 838 to heat exchanger 824, and back to pump 842 along channel 840. Valve 836 may also direct internal coolant along channels 846 and 852 if desired. This may allow chiller 848 and radiator 854 to work in conjunction with heat exchanger 824 to remove heat from the internal coolant, if desired. In this way, cooling system 800 may take advantage of cooling mechanisms located in both charging station 804 and vehicle battery temperature management system 802.

The internal coolant may be any coolant appropriate for use in vehicle battery temperature management system 802. The internal coolant may the same as the liquid coolant dispensed from the charging station, or a different coolant.

Figure 9:
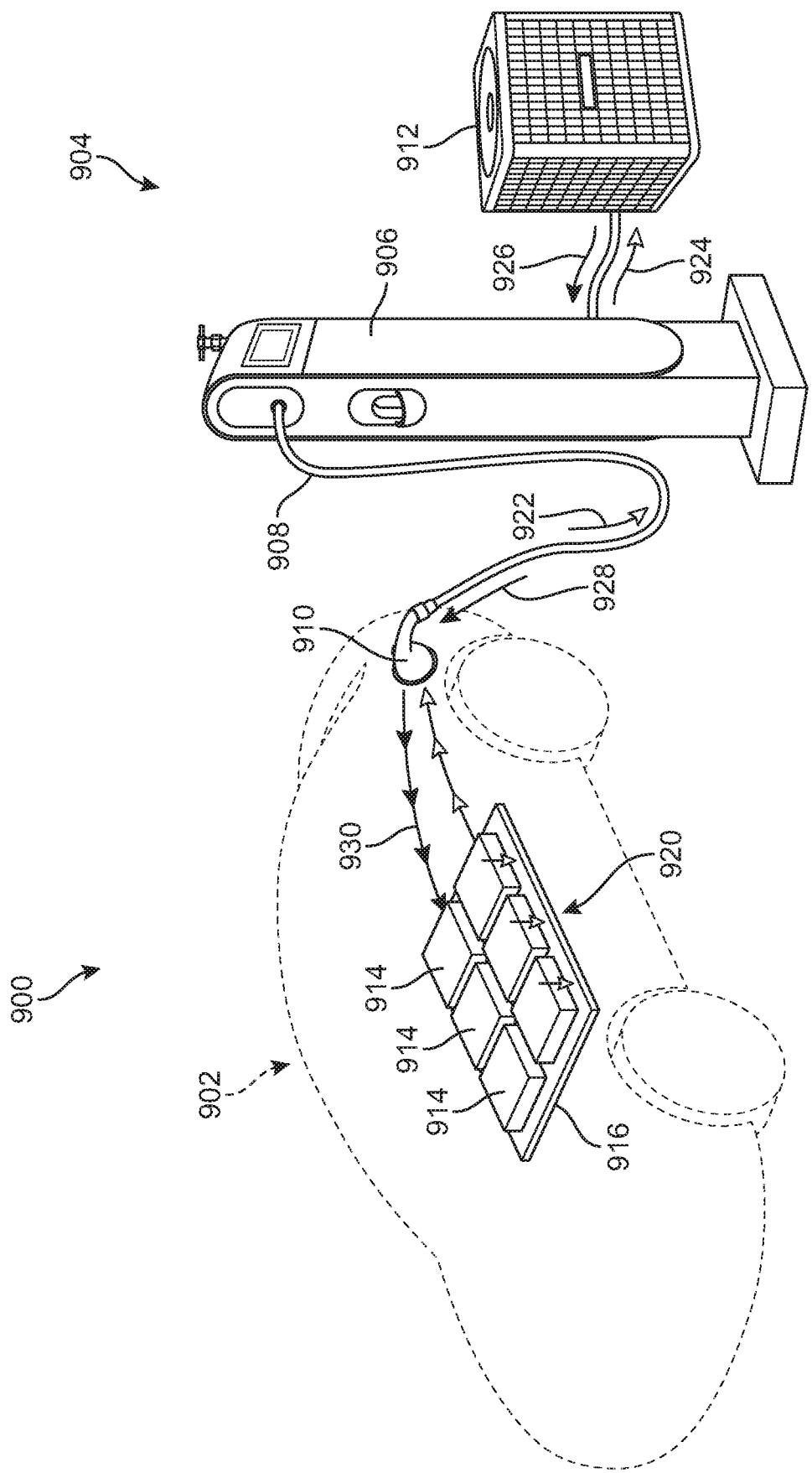
FIG. 9 is an isometric diagram view of heat flow throughout an electric motor vehicle cooling system.

FIG. 9 shows an isometric view of an embodiment of an electric motor vehicle cooling system 900. In this embodiment, the flow of heat within the system 900 is illustrated. Namely, heat is first generated by batteries 914 within vehicle 902. This heat is then transferred to battery heat sink 920. From there, heat is transferred out of vehicle 902 through adaptor 910 and along cable 908 as shown per 922. Cable 908 is connected to charging station 904 at base 906, which transfer heat to chiller 912 along 924. The chilled coolant is then moved back along 926, along 928, and 930 to the batteries to further cool them.

While various embodiments have been described, the description is intended to be exemplary, rather than limiting and it will be apparent to those of ordinary skill in the art that many more embodiments and implementations are possible that are within the scope of the claims. Additionally, one or more of the various embodiments described above may be combined in part or in whole in accordance with the principles described herein. Accordingly, the embodiments are not to be restricted except in light of the attached claims and their equivalents. Also, various modifications and changes may be made within the scope of the attached claims.

What is claimed is:

1. An electric motor vehicle charging station, comprising:
   a base, the base including a source of electricity and a pump;
   a cable, the cable being connected to the base at a first end of the cable, the cable including:
      at least one electrical wire that carries electrical current from the source of electricity,
      a hose including an outlet channel and an inlet channel;
      a housing layer surrounding the hose;
      wherein the at least one electrical wire is located in the housing layer, and wherein the hose and the housing layer are coaxial;
   an adaptor, the adaptor being connected to a second end of the cable and being configured to interface with a receptor on an electric motor vehicle; and
   a liquid coolant;
   wherein the adaptor further includes
      at least one electrical charging connector, connected to the at least one electrical wire in the cable;
      a liquid coolant outlet port, connected to the outlet channel of the hose and configured to allow the liquid coolant to exit the charging station, and
      a liquid coolant inlet port, connected to the inlet channel of the hose and configured to receive the liquid coolant into the electric motor vehicle charging station; and
   wherein the electric motor vehicle charging station is configured to move the liquid coolant with the pump in a cycle from the base, through the outlet channel of the hose in the cable, out of the liquid coolant outlet port on the adaptor, into the electric motor vehicle, into the liquid coolant inlet port on the adaptor, through the inlet channel of the hose in the cable, and back into the base.

2. The electric motor vehicle charging station of claim 1, wherein:
   the base further comprises a chiller; and
   the chiller is continuous with the inlet channel of the hose, such that the liquid coolant entering the electric motor vehicle charging station via the liquid coolant inlet port is cooled in the chiller, and the liquid coolant that has been cooled in the chiller exits the electric motor vehicle charging station through the liquid coolant outlet port via the outlet channel of the hose.

3. The electric motor vehicle charging station of claim 2, wherein:
   the base further comprises a controller;
   the adaptor further comprises a control port, the control port being in electronic communication with the controller and configured to interface with a control receptor on the electric motor vehicle;
   wherein the controller controls the pump and the chiller based on temperature data received from the electric motor vehicle via the control port.

4. The electric motor vehicle charging station of claim 1, wherein:
   the base further comprises a bleed valve, the bleed valve being configured to release any air that has become mixed with the liquid coolant.

5. The electric motor vehicle charging station of claim 1, wherein the source of electricity is at least one of an electric grid or a set of solar panels.

6. The electric motor vehicle charging station of claim 1, wherein:
   the adaptor includes a first electrical charging port and a second electrical charging port;
   the liquid coolant outlet port is located concentrically around the first electrical charging port; and
   the liquid coolant inlet port is located concentrically around the second electrical charging port.

7. The electric motor vehicle charging station of claim 1, wherein the liquid coolant is selected from a group consisting of: water, ethylene glycol, polyalkylene glycol, polyethylene glycol, and mixtures thereof.

8. An electric motor vehicle comprising:
a battery;
a battery temperature management system; and
a receptor, the receptor being configured to interface with an adaptor of an electric motor vehicle charging station;
wherein the receptor includes:
a liquid coolant inlet port, the liquid coolant inlet port being configured to receive a liquid coolant into the electric motor vehicle, and
a liquid coolant outlet port, the liquid coolant outlet port being configured to allow the liquid coolant to exit the electric motor vehicle;
wherein the battery temperature management system further includes:
an internal coolant and a heat sink that is adjacent to the battery, the internal coolant being in thermal contact with the heat sink; and
a heat exchanger; and
wherein the liquid coolant interfaces with the battery temperature management system by entering one side of the heat exchanger, such that the internal coolant exchanges heat with the liquid coolant in a manner to cool the battery when the electric motor vehicle is charging at the electric motor vehicle charging station.

9. The electric motor vehicle of claim 8, wherein:
the battery temperature management system includes a first bypass valve adjacent to the heat sink on a downstream side and a second bypass valve adjacent to the heat sink on an upstream side; and
the liquid coolant interfaces with the battery temperature management system by entering the battery temperature management system at the first bypass valve, passing through the heat sink, and exiting the battery temperature management system at the second bypass valve.

10. The electric motor vehicle of claim 8, wherein:
the battery temperature management system further includes a radiator, a chiller, and a pump configured to move the internal coolant through the battery temperature management system.

11. The electric motor vehicle of claim 8, wherein the battery temperature management system further includes:
a radiator,
a chiller,
a pump configured to move the internal coolant through the battery temperature management system, and
a control valve configured to direct a flow of the internal coolant to one or more of the heat exchanger, the chiller, and the radiator.

12. The electric motor vehicle of claim 8, wherein:
the receptor further includes at least one electrical port, the at least one electrical port being configured to accept electricity from the electric motor vehicle charging station, and a control port; and
the electric motor vehicle further includes a vehicle controller, the vehicle controller being configured to accept battery temperature data generated from a battery temperature sensor and send the battery temperature data to the control port on the receptor,
the control port on the receptor being configured to relay the battery temperature data to the electric motor vehicle charging station.

13. An electric motor vehicle cooling system, comprising:
an electric motor vehicle charging station;
an electric motor vehicle including a battery and a battery temperature management system, the battery temperature management system comprising an internal coolant and a heat exchanger; and
a liquid coolant;
wherein the battery temperature management system is configured such that the internal coolant transfers heat to the liquid coolant in the heat exchanger; and
wherein the electric motor vehicle charging station is in fluidic communication with the electric motor vehicle in a way such that the electric motor vehicle charging station and the electric motor vehicle collectively form a battery cooling loop through which the liquid coolant is cycled.

14. The electric motor vehicle cooling system of claim 13, wherein:
the electric motor vehicle charging station is reversible connected to the electric motor vehicle by a cable;
the cable includes an adaptor and a hose, the hose comprising an outlet channel and an inlet channel;
the liquid coolant is transferred from the electric motor vehicle charging station into the electric motor vehicle through the outlet channel, and the liquid coolant is transferred from the electric motor vehicle back into the electric motor vehicle charging station through the inlet channel.

15. The electric motor vehicle cooling system of claim 13, wherein:
the battery temperature management system includes an inlet valve and an outlet valve;
wherein the battery temperature management system is configured such that the liquid coolant enters into the battery temperature management system through the inlet valve, and exits the battery temperature management system through the outlet valve.

16. The electric motor vehicle cooling system of claim 13, wherein the electric motor vehicle charging station includes:
a source of electricity;
a pump;
a chiller; and
a cable, the cable including (a) at least one electrical wire that carries electrical current from the source of electricity, (b) a hose comprising an outlet channel and an inlet channel, and (c) an adaptor configured to interface with a receptor on the electric motor vehicle;
wherein the cable further includes (d) at least one electrical charging connector, connected to the at least one electrical wire in the cable, (e) a liquid coolant outlet port, connected to the outlet channel of the hose and configured to allow the liquid coolant to exit the electric motor vehicle charging station and enter the electric motor vehicle, and (f) a liquid coolant inlet port; connected to the inlet channel of the hose and configured to receive the liquid coolant into the electric motor vehicle charging station from the electric motor vehicle.

17. The electric motor vehicle cooling system of claim 16, wherein the source of electricity is at least one of an electric grid or a set of solar panels.

18. The electric motor vehicle cooling system of claim 13, wherein
the electric motor vehicle includes a receptor, the receptor being configured to interface with an adaptor on a cable of the electric motor vehicle charging station;

wherein the receptor includes:
    at least one electrical charging connector;
    a liquid coolant inlet port, the liquid coolant inlet port being configured to receive the liquid coolant into the electric motor vehicle, and
    a liquid coolant outlet port, the liquid coolant outlet port being configured to allow the liquid coolant to exit the electric motor vehicle.

19. The electric motor vehicle cooling system of claim 13, wherein the battery cooling loop includes:
    an outlet channel in a hose within a cable, the cable reversible connecting the electric motor vehicle charging station to the electric motor vehicle;
    a liquid coolant outlet port on an adaptor at an end of the cable;
    a liquid coolant vehicle inlet port on a receptor in the electric motor vehicle;
    the battery temperature management system in the electric motor vehicle;
    a liquid coolant vehicle outlet port on the receptor;
    a liquid coolant inlet port on the adaptor;
    the heat exchanger in the electric motor vehicle charging station; and
    a chiller in the electric motor vehicle charging station.

* * * * *